(12) United States Patent
Simms et al.

(10) Patent No.: US 12,334,850 B2
(45) Date of Patent: Jun. 17, 2025

(54) CONTROL SYSTEMS AND METHODS FOR MITIGATING MOTOR START-UP INSTABILITIES IN LIGHTLY LOADED CONDITIONS NEAR SYNCHRONOUS SPEED

(71) Applicant: Eaton Intelligent Power Limited, Dublin (IE)

(72) Inventors: Stan Simms, Arden, NC (US); Gabriel Teixeira Braga, Belo Horizonte (BR)

(73) Assignee: Eaton Intelligent Power Limited, Dublin (IE)

( * ) Notice: Subject to any disclaimer, the term of this patent is extended or adjusted under 35 U.S.C. 154(b) by 24 days.

(21) Appl. No.: 18/460,869

(22) Filed: Sep. 5, 2023

(65) Prior Publication Data
US 2025/0080024 A1    Mar. 6, 2025

(51) Int. Cl.
| | | |
|---|---|---|
| G05B 5/00 | (2006.01) | |
| H02P 23/04 | (2006.01) | |
| H02P 23/14 | (2006.01) | |

(52) U.S. Cl.
CPC .............. *H02P 23/04* (2013.01); *H02P 23/14* (2013.01)

(58) Field of Classification Search
CPC ............... H02P 23/04; H02P 6/20; H02P 1/26
See application file for complete search history.

(56) References Cited

U.S. PATENT DOCUMENTS 11,128,240 B1    9/2021  Tang

FOREIGN PATENT DOCUMENTS

WO    WO-0189072 A2 *  11/2001  ................ H02P 1/26

* cited by examiner

*Primary Examiner* — Karen Masih
(74) *Attorney, Agent, or Firm* — Stanek Lemon Crouse & Meeks, PA

(57) ABSTRACT

Inventive concepts herein relate to mitigating phase current oscillations and vibrations in a spinning, lightly loaded three-phase electric motor. A motor starter can transition between various acceleration profiles defined by unique firing angles and/or firing angle rates of change. These transitions adjust the firing angle of thyristors, which directly manage each phase of a three-phase power supply to the motor. The motor start can identify when a motor has residual motion from prior operation and can modulate the firing angle and/or firing angle rate of change accordingly to reduce a duration of time that issues such as phase current oscillations or vibrations might occur.

20 Claims, 6 Drawing Sheets

CONTROL SYSTEMS AND METHODS FOR MITIGATING MOTOR START-UP INSTABILITIES IN LIGHTLY LOADED CONDITIONS NEAR SYNCHRONOUS SPEED

FIELD

The present disclosure generally relates to motor soft starters, and more particularly to control systems for managing the start-up of still-in-motion induction motors.

BACKGROUND

The operational aspects of induction motors are often regulated through the integration of control systems, encompassing functions such as start-up and shutdown procedures. Within the context of start-up procedures, a common approach involves utilizing a soft-starter that gradually augments the motor's startup voltage, to attempt to control current flow and mechanical strain. However, existing soft-starters often face challenges during rapid restarts of motors, when the motor shaft has not come to a complete stop before being restarted. Consequently, the effective control of start-up for spinning motors remains a challenge in the field of controllers.

SUMMARY

Embodiments of the present disclosure provide systems, methods, and apparatuses for mitigating motor start-up instabilities in a lightly loaded motor. A method can include communicating a first command signal to transition to a first acceleration profile, determining an occurrence of a first condition, communicating a second command signal to transition to a second acceleration profile based on the occurrence of the first condition, determining an occurrence of a second condition, and communicating a third command signal to transition to a third acceleration profile. The first acceleration profile can be characterized by a first firing angle and a first rate. Transitioning to the first acceleration profile can configure a firing angle of a set of thyristors to the first firing angle value and a firing angle rate of change to the first rate. The firing angle can correspond to an angular position of the set of thyristors. Each phase of a three-phase power supply to the electric motor can be controlled by a pair of thyristors from the set of thyristors. The power supplied to the electric motor can be modulated based on the firing angle. The occurrence of the first condition can indicate that the electric motor had residual motion and was lightly loaded upon transition to the first acceleration profile. The first condition can be characterized by an elapse of a predetermined delay period since the transition to the first acceleration profile and an RMS current of the electric motor failing to satisfy a first current threshold. The second acceleration profile can be characterized by a second rate. The transitioning to the second acceleration profile can configure the firing angle rate of change to the second rate. The second rate can be greater than the first rate. The second condition can be characterized by the firing angle satisfying a firing angle threshold and the RMS current failing to satisfy a second current threshold. The third acceleration profile can be characterized by a second firing angle value. Transitioning to the third acceleration profile can configure the firing angle to the second firing angle value. The second firing angle value can correspond to full operation of the electric motor. Transitioning to the third acceleration can result in application of full voltage on all three distinct electrical phase simultaneously.

Embodiments of the present disclosure provide systems, methods, and apparatuses for controlling an electric motor. A method can include communicating a first command signal to transition to a first acceleration profile, determining an occurrence of a first condition, communicating a second command signal to transition to a second acceleration profile based on the occurrence of the first condition, determining an occurrence of a second condition, and communicating a third command signal to transition to a third acceleration profile. The first acceleration profile can be characterized by a first firing angle and a first rate. The transitioning to the first acceleration profile can configure a firing angle of a set of semiconductor switches to the first firing angle value and a firing angle rate of change to the first rate. The firing angle corresponds to an angular position of the set of semiconductor switches. The power supplied to the electric motor can be modulated based on the firing angle. The second acceleration profile can be characterized by a second rate. The transitioning to the second acceleration profile can configure the firing angle rate of change to the second rate. The second rate can be greater than the first rate. The third acceleration profile can be characterized by a second firing angle value. The transitioning to the third acceleration profile can configure the firing angle to the second firing angle value. The second firing angle value corresponds to full operation of the electric motor.

The method of any of the previous paragraphs can include any combination of the steps or features of this paragraph. The first condition can be characterized by an RMS current of the electric motor failing to satisfy a first current threshold. The first current threshold can be at least 150% of a rated FLA of the electric motor. The first condition can be further characterized by an elapse of a predetermined delay period since the transition to the first acceleration profile. The first condition can be further characterized by the firing angle satisfying a first firing angle threshold. The occurrence of the first condition can indicate that the electric motor had residual motion and was lightly loaded upon transition to the first acceleration profile. The second rate can be greater than 1.5 times the first rate. The second rate can be greater than 4 times the first rate. The occurrence of the second condition can be characterized by the firing angle satisfying a firing angle threshold and the RMS current failing to satisfy a second current threshold.

The method of any of the previous paragraphs can include any combination of the steps or features of this paragraph. The firing angle threshold can be about 85 degrees. The second current threshold can be about 40% of the rated FLA of the electric motor. The set of semiconductor switches can include six thyristors. Each phase of a three-phase power supply to the electric motor can be controlled by a pair of thyristors from the set of thyristors. The transitioning to the third acceleration profile results in firing of all six thyristors with full voltage on all three distinct electrical phase simultaneously. Configuring the firing angle to the first value the first value provides current to the electric motor without inducing asymmetric magnetic inrush. The method can include ignoring up-to-speed detections while the firing angle advances from 135 through 112.5 degrees. The transitioning to the third acceleration profile results in an abrupt transition of the firing angle of the semiconductor switches to a fully advanced position.

Embodiments of the present disclosure provide systems, methods, and motor starters for controlling an electric motor.

A motor starter for mitigating phase current oscillations and vibrations in a spinning, lightly loaded electric motor can include a plurality of semiconductor switches and a control circuit. The plurality of semiconductor switches can be configured to couple respective phases of an AC power source to respective phases of a motor. The control circuit can be configured to communicate a first command signal to transition to a first acceleration profile; communicate a second command signal to transition to a second acceleration profile based on the occurrence of a first condition; and communicate a third command signal to transition to a third acceleration profile based on an occurrence of a second condition. The first acceleration profile can be characterized by a first firing angle and a first rate. The transitioning to the first acceleration profile can configure a firing angle of the set of semiconductor switches to the first firing angle value and a firing angle rate of change to the first rate. The firing angle can correspond to an angular position of the set of semiconductor switches. The power supplied to the electric motor can be modulated based on the firing angle. The second acceleration profile can be characterized by a second rate. The transitioning to the second acceleration profile can configure the firing angle rate of change to the second rate. The second rate can be greater than the first rate. The third acceleration profile can be characterized by a second firing angle value. The transitioning to the third acceleration profile can configure the firing angle to the second firing angle value. The second firing angle value can correspond to full operation of the electric motor.

The motor starter of any of the previous paragraphs can include any combination of the features of this paragraph. The first condition can be characterized by an RMS current of the electric motor failing to satisfy a first current threshold, an elapse of a predetermined delay period since the transition to the first acceleration profile, and/or the firing angle satisfying a first firing angle threshold. The first current threshold can be at least 150% of a rated FLA of the electric motor. The occurrence of the first condition can indicate that the electric motor had residual motion and was lightly loaded upon transition to the first acceleration profile. The occurrence of the second condition can be characterized by the firing angle satisfying a firing angle threshold and the RMS current failing to satisfy a second current threshold. The second current threshold can be between about 35% to 45% of a rated FLA of the electric motor.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Figure 1A:
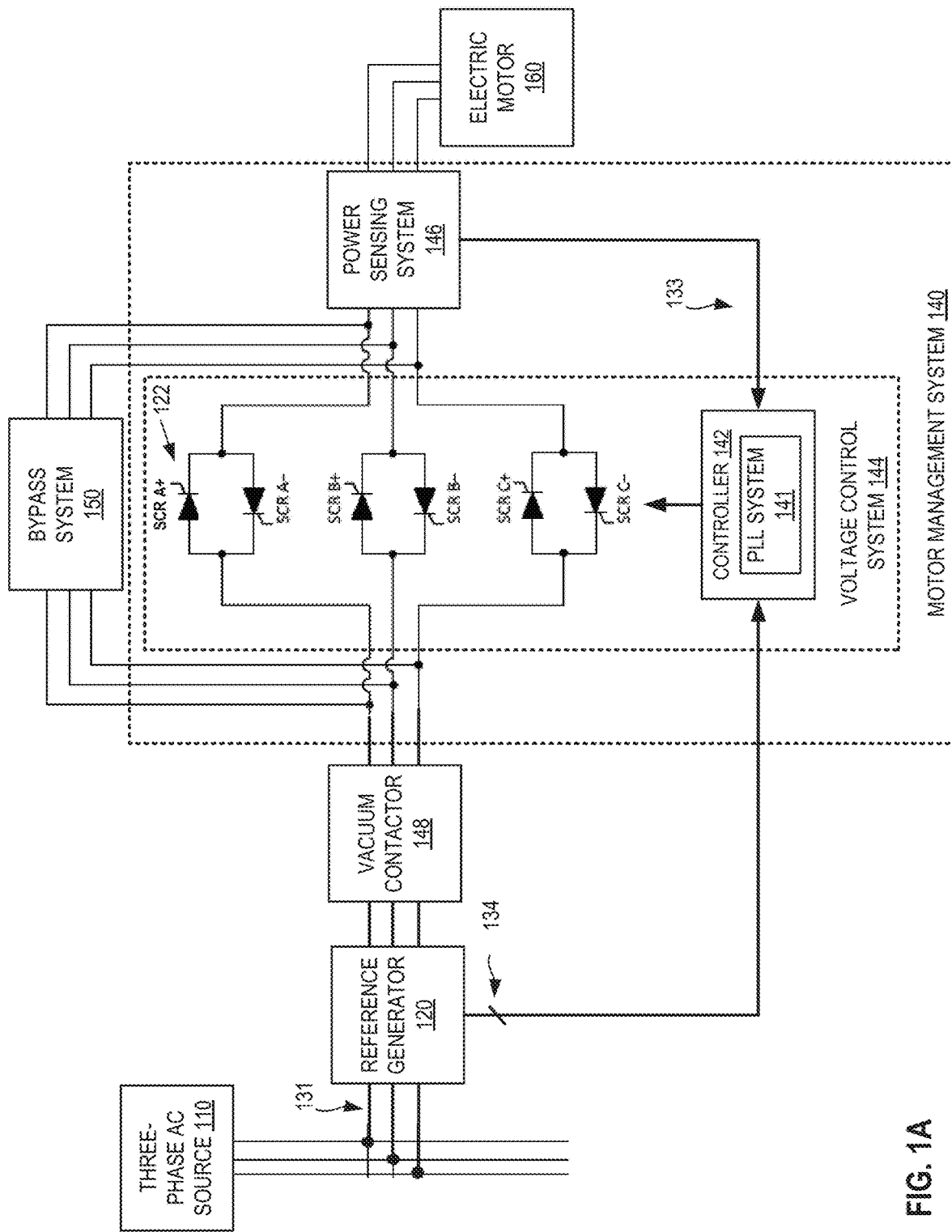
FIG. 1A is a schematic diagram illustrating an example soft starter environment according to some embodiments of the inventive concepts.

The term "lightly loaded," as used herein, refers to the operational status of an electric motor where the motor is functioning under a load that is lower than its maximum or rated load capacity. For instance, a motor might be characterized as "lightly loaded" if it operates at anything less than 100% of its total rated load, including being "unloaded" (i.e., operating at 0% load). In certain contexts, "lightly loaded" can more restrictively refer to instances where the motor operates at significantly lower than its total rated load, such as less than about 75%, less than about 50%, or less than about 25% of its total rated load. As an example, consider an electric motor designed with a maximum capacity to handle a load of 100 horsepower (hp). In this context, if the motor is only powering applications requiring 25 hp and 50 hp, it could be deemed as being "lightly loaded."

Introduction

The start-up of motors whose shafts remain in motion from a prior operation can present significant challenges. For instance, such motors, particularly when lightly loaded, can exhibit vibrations upon restart. These vibrations can lead to phase current fluctuations, magnetic inrush, compromised torque generation, or potential voltage sag, among other complications, as the motor works to regain speed. Notably, in certain applications such as chippers or saws, the motors are often lightly loaded, retaining enough inertia to keep the shaft spinning for an extended period even after a stop command has been issued. This persistent rotation, especially in industrial applications that mandate frequent stop-start cycles, adds complexity to the motor restart process.

Traditional control systems, such as those employed in voltage ramp (VR) soft-starters, often struggle under these conditions. For example, traditional methods are often designed to switch to a bypass mode—a state where the motor connects directly to the line voltage, bypassing the soft starter—once a certain motor speed is reached. However, the inherent fluctuations in phase current can mislead these systems into prematurely transitioning to the bypass mode, causing issues such as false jam overcurrent or unbalance faults as the motor may not have genuinely reached the necessary speed. Existing methods often fall short in effectively managing these complex scenarios, highlighting the need for improved control approaches.

To address these or other challenges, some inventive concepts presented herein include soft starter techniques and systems where the alpha angle, corresponding to the SCR thyristor firing timing, can be dynamically adjusted during the start-up of induction motors that are still in motion. Through a strategic increase of the alpha angle, the current can be effectively managed to lessen magnetic inrush, facilitate torque generation, or mitigate potential voltage sag, thus aiding in a smoother transition to bypass mode. Application of these inventive concepts can advantageously decrease the duration and/or intensity of vibrations and phase current fluctuations typically seen during the restart of lightly loaded motors still in motion.

Some inventive concepts presented herein include soft starter techniques and systems for dynamically switching between multiple distinct acceleration profiles, tailoring the control strategy to the electric motor's operational conditions. A first acceleration profile can initiate the electric motor start-up and systematically increase the firing angle over time. When operational parameters such as low RMS current for a given alpha fire angle suggest the electric motor was still spinning and/or lightly loaded, a second acceleration profile can be deployed that abruptly advances the firing angle to full advance. This rapid transition in firing angle can facilitate a swift acceleration to full operational speed. Furthermore, this strategic modulation of the firing angle can mitigate premature transitions to bypass mode and erroneous up-to-speed detections, leading to an enhancement in the electric motor's operational efficiency and reliability.

Environment Overview

FIG. 1A is a schematic diagram illustrating an example soft starter environment according to some embodiments of the inventive concepts. The environment 100 includes a power source 110, a reference generator 120, a phase locked loop (PLL) system 141, a motor management system 140, a bypass system 150, and an electric motor 160. The motor management system 140 includes a controller 142, a voltage control system 144, a power sensing system 146, and a vacuum contactor 148. It will be appreciated that the environment 100 and/or the motor management system 140 can include fewer, more, or different components.

The power source 110 can serve as a power input for the environment 100, such as the power for the electric motor 160. In some embodiments, the power source 110 is implemented as a three-phase AC source.

The reference generator 120 is electrically coupled to the power source 110 and can generate AC reference signals 134. For example, the reference generator 120 can obtain phase voltage signals 131 indicative of the phase voltages of the power source 110, and can derive a single-phase voltage, which can be the AC reference signals 134. In some cases, the reference generator 120 is implemented as an open-delta potential transformer voltage sensor, where signals 134 produce three phase signals that correspond to the phase of the power source 110. The AC reference signals 134 may be used by the motor management system 140 to manage operation of the electric motor 160.

The PLL system 141 can operate as a control structure, producing an output signal that corresponds in phase to the reference signals 134. As described, the reference generator 120 can facilitate the provision of reference signals 134 to the PLL system 141. The reference signals 134 can characterize the phase of the voltage of the power source 110. Upon reception of the reference signals 134, the PLL system 141 can align its output signal phase with the phase of the reference signals 134. This synchronized output signal can serve multiple functions within the environment 100. The output can be provided to the motor management system 140, such as to the controller 142.

The motor management system 140 can include, but is not limited to, a controller 142, a voltage control system 144, and/or a power sensing system 146. The motor management system 140 can control or regulate the electric motor 160. For example, in some cases, the motor management system 140 can act as a motor starter or a soft starter, ensuring a smooth start or restart of the electric motor 160.

The motor management system 140 can apply diverse acceleration profiles, adjusting its control strategy based on the particular operating parameters of the electric motor 160. The motor management system 140 can dynamically adjust the alpha angle, or the firing angle of the thyristors, during the startup phase of the electric motor 160. This can allow the motor management system 140 to manage the motor current, generate torque, decrease potential voltage sag, or shorten the period of disruptive phase current oscillations and vibrations. The motor management system 140 can receive and/or process inputs from an AC reference signals 134 and current feedback signals 133. This information can be used to modulate the operations of the voltage control system 144.

The controller 142 can be implemented in hardware, software, or a combination of both. In some embodiments, the controller 142 can include a control circuit and/or a processor with computer readable instructions. The controller 142 can provide an output to regulate the voltage supplied to the electric motor 160, for example based on an AC reference signals 134 and current feedback signals 133.

In some cases, the controller 142 can incorporate a series of control algorithms and/or rules. These algorithms or rules can facilitate the flexibility to adjust the motor's operation to match the specific requirements of the application. The controller 142 may perform various control operations, such as implementing acceleration profiles or dynamically adjusting the alpha angle during the startup phase of the electric motor 160. Additionally, the controller 142 may process real-time feedback to modify the motor's behavior to maintain performance parameters. In certain cases, the controller 142 can include computer-readable instructions facilitating any of the aforementioned functionality.

The voltage control system 144 can include a set of semiconductor switches that facilitate selective coupling of respective phases of the power source 110 to corresponding phases of the electric motor 160. The semiconductor switches can include, but are not limited to, any combination of thyristors, silicon-controlled rectifiers (SCRs), or other power electronic devices capable of controlling the flow of current. In the illustrated embodiment of FIG. 1A, the voltage control system 144 includes six thyristors, arranged as three pairs of anti-parallel connected thyristors denoted as SCR A+/SCR A−, SCR B+/SCR B−, SCR C+/SCR C−. It will be appreciated that more, fewer, or different semiconductor switches may be utilized.

In this example, each pair of thyristors corresponds to a different phase of the power source 110 and the electric motor 160. In some cases, the controlled-switching characteristics of these semiconductor switches can permit precise control of energy (e.g., voltage) applied to the electric motor 160. For example, the thyristors can be turned on and off in a coordinated manner, based on a parameter known as the firing or "alpha" angle. The alpha angle signifies the time delay from the zero crossing of the AC voltage waveform to the instant the thyristor is triggered or fired. In the context of a soft-starter, the alpha angle can be held constant over one AC line cycle, ensuring that all six SCRs (A+ through C−) receive the same firing angle. The motor management system 140 can adjust this angle, either advancing or retarding it, for the subsequent AC line cycle. In some cases, the motor management system 140 does not to alter the alpha angle mid-cycle, as this could introduce a half-cycle DC offset, potentially disturbing the motor's flux and leading to operational issues. By adjusting the alpha angle, the motor management system 140 can control the amount of power transferred to the electric motor 160, enabling the electric motor 160 to operate in different conditions, such as during light load conditions or when transitioning to full operation mode.

As used herein, the term "firing angle" can refer to the point in an AC cycle at which a semiconductor switch, such as a thyristor, is triggered or 'fired'. The firing angle typically varies between 0 to 180 degrees per half-cycle. For example, a 0-degree firing angle indicates a fully "on" state of a semiconductor switch, allowing the maximum amount of power from the AC waveform to reach the motor. Conversely, a 180-degree firing angle signifies a fully "off" state, where no power from the AC waveform is transferred to the motor. An initial firing angle could be set to a larger numeric value, such as 135 degrees, often referred to as a 'retarded' angle, to mitigate certain operational impacts when power is first supplied to the motor.

The term "rate of increase of the firing angle" refers to the speed or pace at which the firing angle is modified over time. In this context, an 'increase' in the firing angle signifies an advancement of the firing event within the AC cycle, essentially moving towards 0 degrees. This adjustment effectively extends the conduction period of the switch, allowing a larger portion of the AC waveform to reach the motor, which can increase the power supplied to the motor. Therefore, a first firing angle initially set at a larger numeric value or 'retarded' position can 'increase' to a lower numeric value, or an earlier firing point within the AC cycle.

The power sensing system 146 can be configured to measure power characteristics associated with the electric motor 160 and generate feedback signals 133 indicative of the measured power characteristics. The power characteristics can include, but are not limited to, phase, current, or voltage associated with the electric motor 160. In some cases, the power sensing system 146 includes one or more CT sensors that can measure phase currents of the electric motor 160. In some such cases, the feedback signals 133 can be indicative of the phase currents of the electric motor 160. The feedback signals 133 may be used by the controller 142 to adjust the operation of the voltage control system 144.

The bypass system 150 can include a bypass switch (e.g., a three-phase contactor) configured to bypass the voltage control system 144 in order to electronically connect the power source 110 directly to the electric motor 160. The bypass system 150 can be controlled by the motor management system 140.

The electric motor 160 can include various types of motors such as, but not limited to, induction motors or synchronous motors. The electric motor 160 can drive a diverse set of equipment or machinery including, but not limited to, chippers, saws, conveyor belts, HVAC fans, pumps, generators, etc.

Operational conditions of the electric motor 160 can vary, such as from lightly loaded conditions, such as a chipper or saw that is switched on but not engaged in active cutting, to fully loaded scenarios, such as a pump operating against a high head or a generator functioning at peak capacity. As described herein, the electric motor 160 can be subjected to start-and-stop cycles, a common operational characteristic across various applications. For instance, the electric motor 160 may cease operation after the completion of a specific task, and then initiate a restart for the subsequent task, occasionally even before the electric motor has fully stopped spinning from the previous use.

Figure 1B:
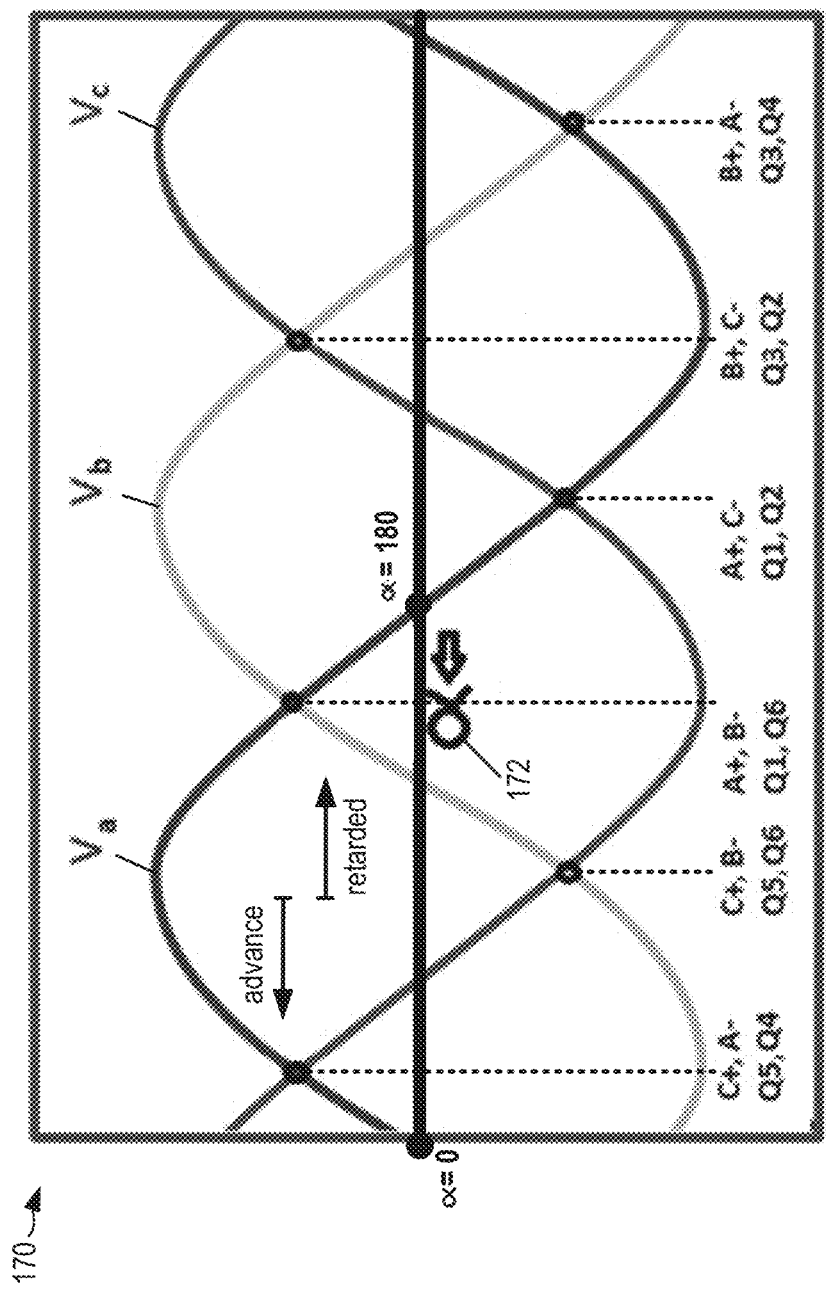
FIG. 1B is a graph of three-phase line-neutral waveforms.

FIG. 1B is a graph 170 of three-phase line-neutral waveforms, denoted as $V_a$, $V_b$, and $V_c$. These waveforms can be characterized by their relationship to one another, and the depiction provides an analytical view of the timing and firing angle in the context of semiconductor-controlled rectifiers (SCRs). In the graphical representation, the left-pointing arrow 172 indicates the increasing Alpha value from the second zero cross of the A phase. In this context, an 'increase' in the firing angle signifies an advancement of the firing event within the AC cycle, essentially moving towards 0 degrees. This signifies that Alpha is growing in the Advance angle.

Figure 2:
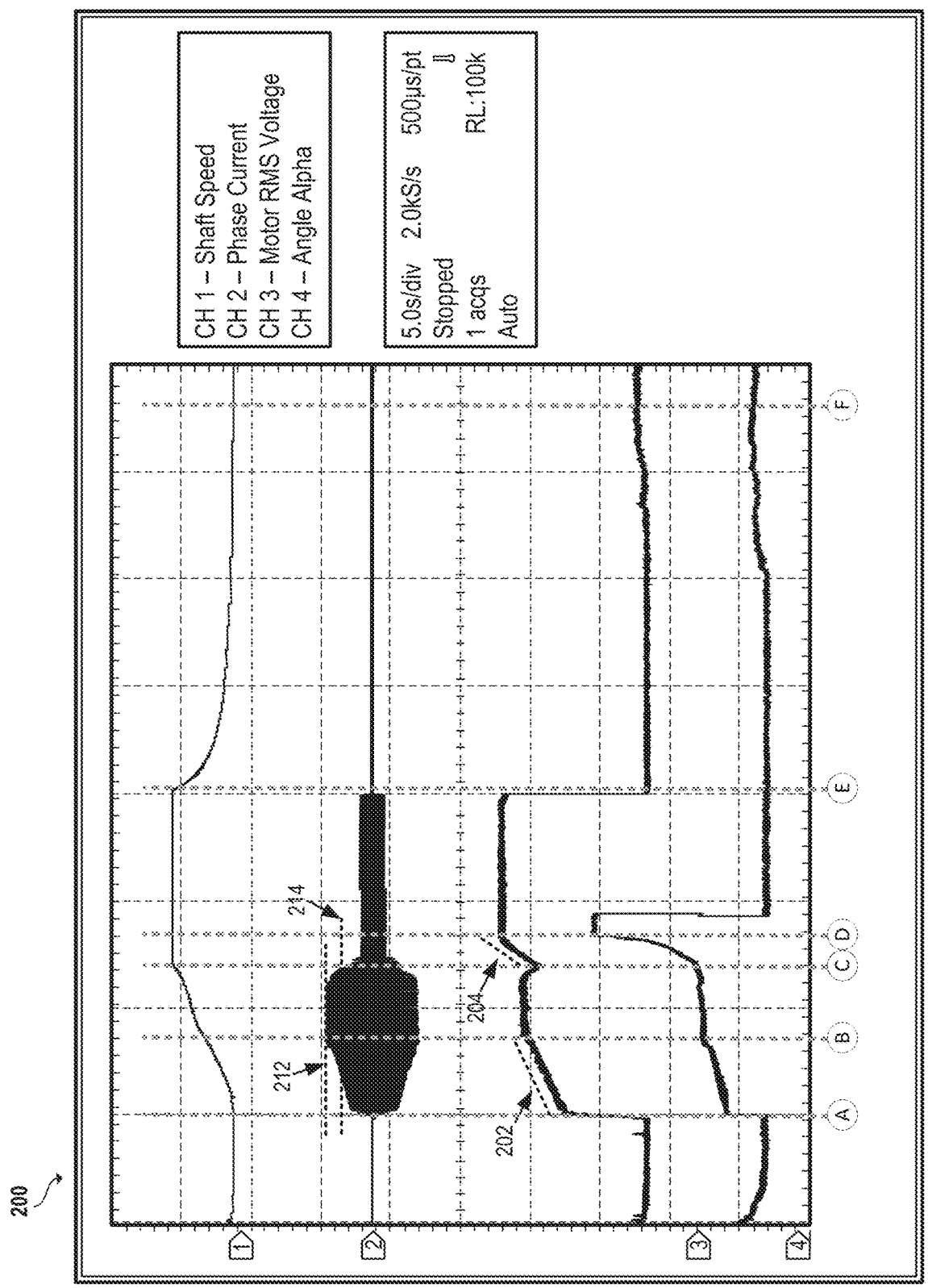
FIG. 2 is a graph illustrating example shaft speed, phase current, RMS voltage, and angle alpha for a loaded start and loaded coast stop of a motor.

FIG. 2 is a graph 200 illustrating example shaft speed, phase current, RMS voltage, and angle alpha for a loaded start and loaded coast stop of a motor. The graph 200 demonstrates the implementation of a starting procedure that employs multiple ramps with varying ramp rates. In some cases, such a procedure can mitigate or entirely eliminate torque ripple. In some cases, the starting procedure may be performed by the motor management system 140.

At Time A, the motor initiates from 0 speed. A first voltage ramp 202, extending from Time A to Time B (sometimes referred to as a ramp-up transition), signifies an initial phase where the semiconductor switches of a voltage control system, such as voltage control system 144, are manipulated to incrementally elevate the voltage applied to the motor. This phase can persist until Time B, at which point the phase current reaches a current limit threshold 212. From Time B to Time C, the Alpha angle continues to undergo a slight advancement over time to maintain the current limit % setting.

As the motor nears an up-to-speed state, the phase current commences a decline. At Time C, when the phase current descends below an up-to-speed detection threshold 214, the semiconductor switches are manipulated to apply a second voltage ramp 204 to the motor. The second voltage ramp 204, spanning from Time C to Time D, is steeper than the first voltage ramp 202.

At Time D, the motor has reached its full speed, and the bypass contactor has fully closed (sometimes referred to as a transition to bypass). The motor is now operating under full voltage, and the phase current has stabilized at a level commensurate with the motor's load.

From Time A to Time D, the motor has undergone a controlled start-up process, with the voltage and phase current carefully managed to ensure smooth acceleration and minimal torque ripple.

At Time E, the motor is deactivated, and a loaded coast stop phase commences. This phase is characterized by a gradual reduction in motor shaft speed, indicative of the motor's deceleration. Given the loaded condition of the motor, this deceleration is relatively swift.

At Time F, the motor has come to a complete stop. The phase current has dropped to zero, and the motor is at rest.

Figure 3:
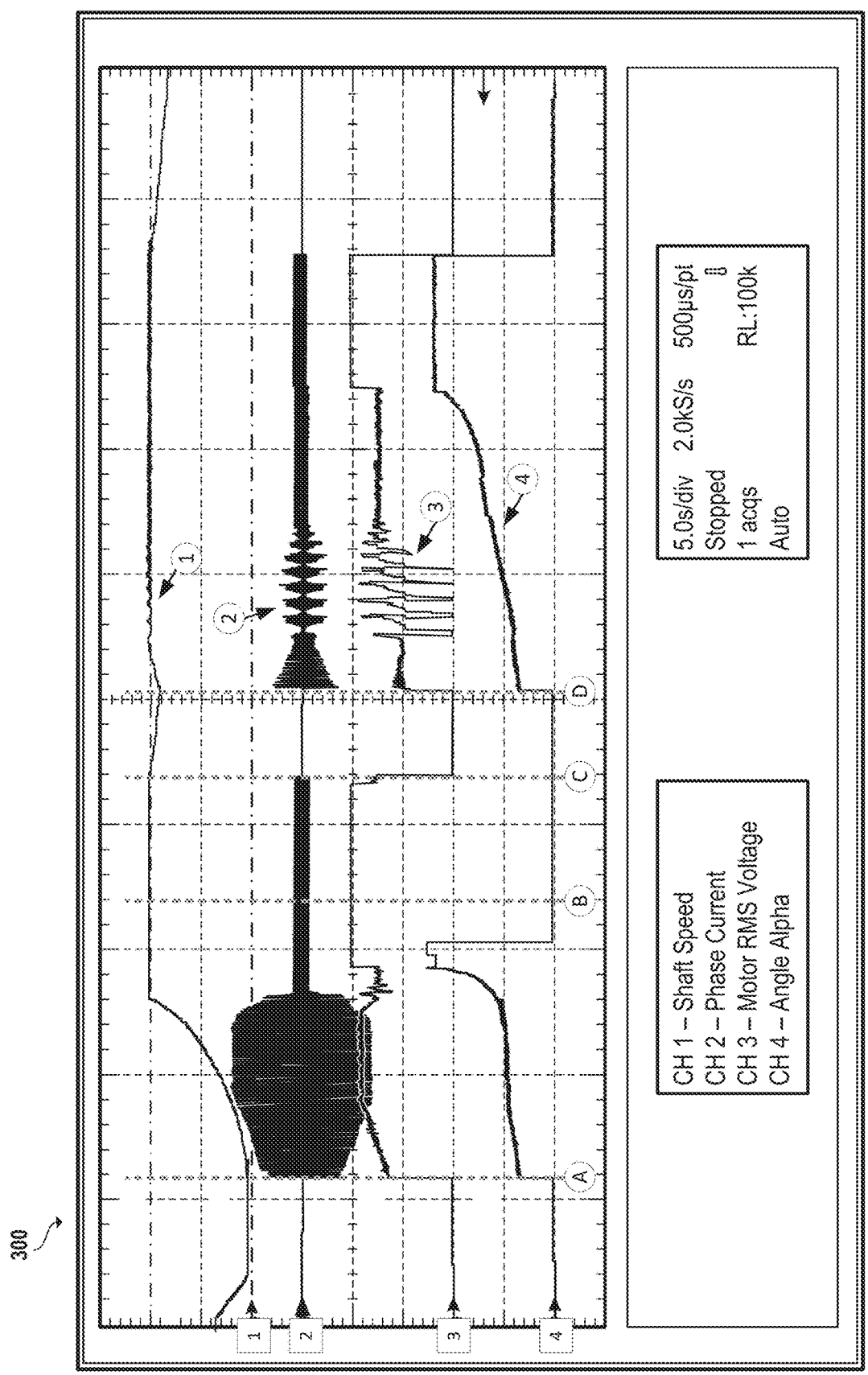
FIG. 3 is a graph illustrating example shaft speed, phase current, RMS voltage, and angle alpha during different operational stages of a motor under light load conditions.

FIG. 3 is a graph 300 illustrating example shaft speed, phase current, RMS voltage, and angle alpha during different operational stages of a motor under light load conditions. These stages include a ramp start, a coast, and a subsequent quick restart prior to full stop. The graph 300 showcases the execution of a restart procedure that incorporates specific control algorithms to regulate the motor's behavior.

At Time A, the motor initiates a start-up process, accelerating to maximum operational speed at Time B. At full speed, as observed at Time B, current is minimal, indicative of a light load. The motor operates until Time C, where it is deactivated and enters a coasting phase.

At Time D, the motor is reactivated prior to complete cessation of prior operation. The interval from Time D to Time E demonstrates the application of an example VR Soft-Starter Voltage Ramp algorithm.

Figure 5:
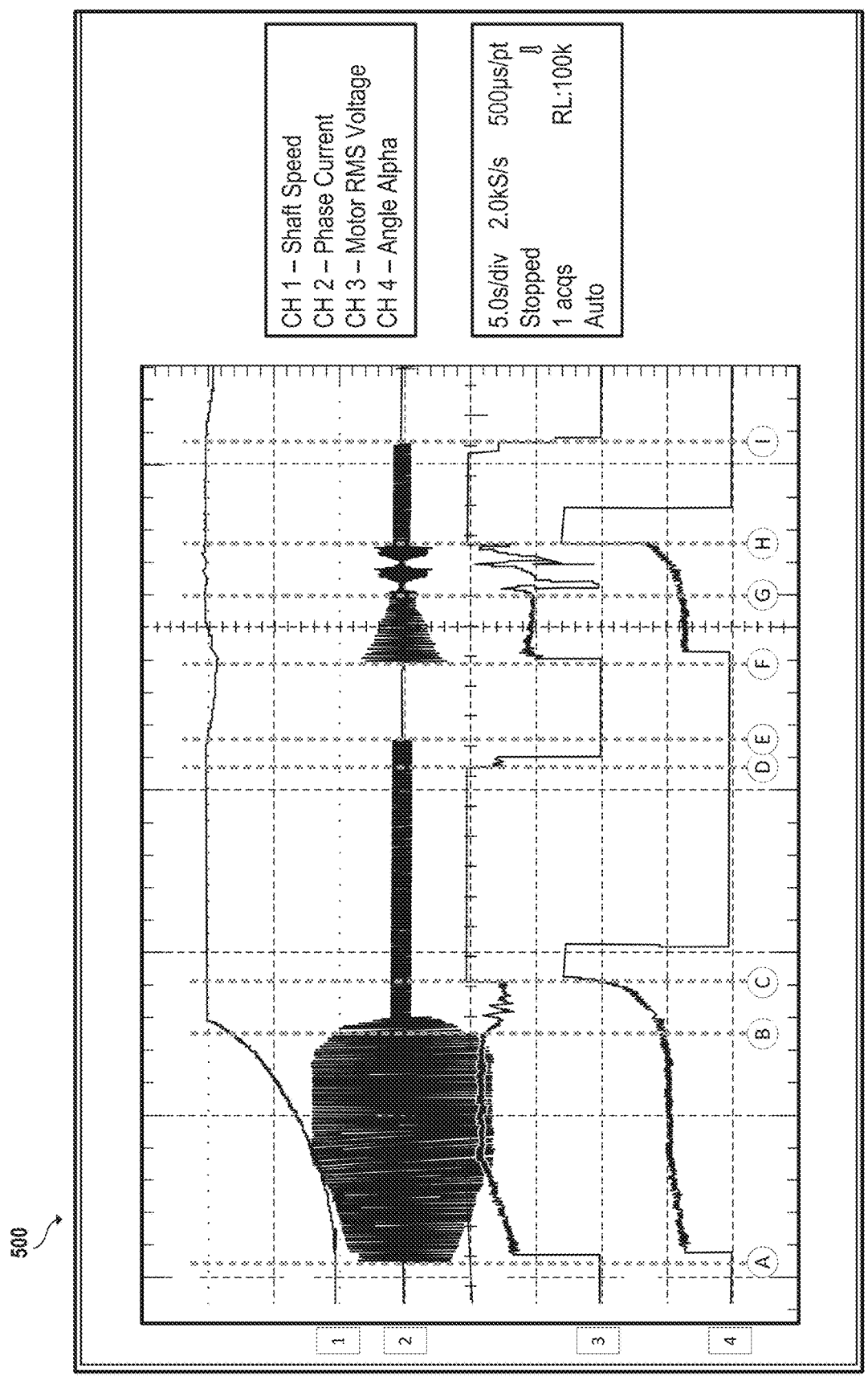
FIG. 5 is a graph illustrating example shaft speed, phase current, RMS voltage, and angle alpha during different operational stages of a motor under light load conditions.

Point 1 on the graph shows that without full voltage, the shaft oscillates, causing vibrations and potential mechanical issues. Point 2 highlights phase current oscillations, a potential source of electrical instability. Point 3 indicates that without full voltage when the shaft is up to speed, the motor's flux is disturbed, affecting the motor's magnetic field and performance. Point 4 demonstrates that a slow alpha advance increases the percentage of current required, implying a greater power requirement for the same performance, potentially reducing motor efficiency. The prolonged Alpha advance, as compared to FIG. 5, is noteworthy.

Alpha Advance Soft-Starter

Conventional control algorithms, especially those utilized in voltage ramp (VR) soft-starters, often grapple with scenarios where a lightly loaded motor, spinning close to its synchronous speed, is given a stop command and then is quickly restarted before the motor comes to a complete stop. This operational situation can trigger rapid fluctuations in phase current, inducing vibrations in the motor shaft. Furthermore, these control algorithms typically plan a transition to a bypass mode when the motor attains a certain speed. However, the fluctuating phase current can cause these algorithms to falsely identify that the required speed has been reached, leading to a premature shift to the bypass mode. This can result in complications, such as unnecessary jam overcurrent faults or unbalance faults, as the motor shaft may not have genuinely achieved the necessary speed. These challenges become particularly pronounced in industrial applications that mandate frequent stop-start cycles, thus raising the likelihood of restarting the motor while it's still spinning close to its maximum speed. The innovative algorithm proposed in the present inventive concepts addresses these complications effectively, enhancing control during the rapid restart of lightly loaded motors.

To address these or other challenges arising when restarting a lightly loaded motor that is still spinning, a controller can dynamically switch between multiple distinct acceleration profiles, tailoring the control strategy to the motor's operational conditions. A first acceleration profile can initiate the motor start-up and systematically increase the firing angle over time. The alpha fire-angle can be proportional to the applied RMS voltage to the motor load. The controller can monitor various operational parameters over time, such as an RMS current variation in relation to the applied voltage, shaft speed, or RMS voltage. When an operational parameter suggests the motor is in a spinning state or lightly loaded, a second acceleration profile can be deployed that abruptly advances the firing angle to full advance. This rapid transition in firing angle can facilitate a swift acceleration to full operational speed, thereby reducing the period where disruptive phase current oscillations and vibrations might occur. Furthermore, this strategic modulation of the firing angle can mitigate premature transitions to bypass mode and erroneous up-to-speed detections, leading to a substantial enhancement in the motor's operational efficiency and reliability.

Figure 4:
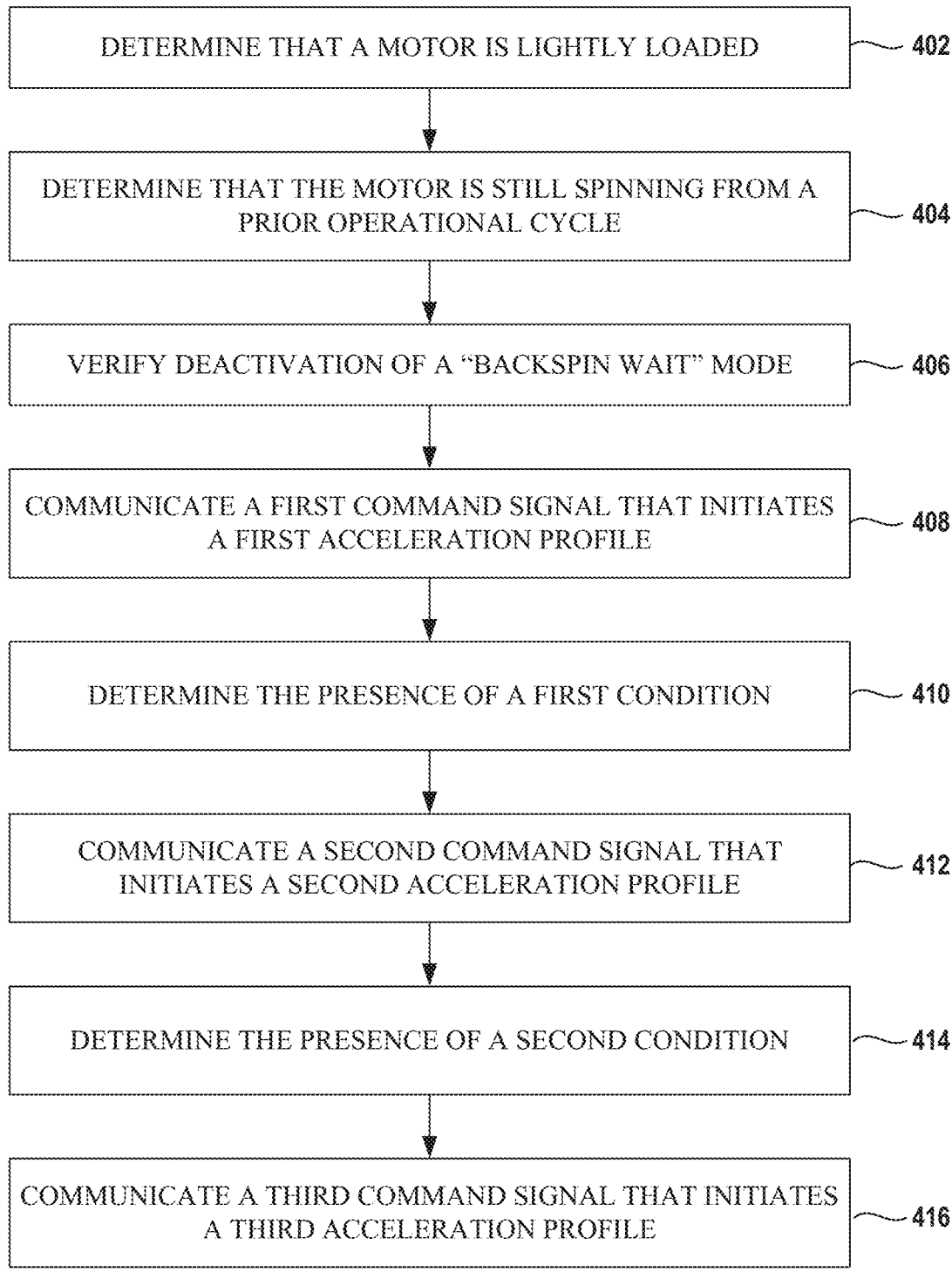
FIG. 4 is a flow diagram illustrative of an embodiment of a routine for starting a lightly loaded motor while it is still spinning after being stopped.

FIG. 4 is a flow diagram illustrative of an embodiment of a routine 400 for starting a lightly loaded motor that is still spinning. Although described as being implemented by the motor management system 140, it will be understood that the elements outlined for routine 400 can be implemented by any one or a combination of hardware and/or software components. For example, one or more portions of the routine 400 may be implemented by any combination of the controller 142, the voltage control system 144, or the power sensing system 146. In addition or alternatively, one or more portions of the routine 400 may be implemented by any combination of the power source 110, the reference generator 120, the PLL system 141, the bypass system 150, or the electric motor 160. Thus, the following illustrative embodiment should not be construed as limiting.

At block 402, the motor management system 140 determines that the electric motor 160 is under a condition characterized as lightly loaded. The occurrence of such conditions can prompt the motor management system 140 to trigger a startup procedure designed for starting a lightly loaded motor.

The determination of whether the electric motor is lightly loaded can be derived from the operating data of the electric motor 160. In some cases, the determination occurs based on operational data from a previous operational cycle. For example, the motor management system 140 can determine whether the electric motor is operating under a lightly loaded state by examining the current flow during the motor's full operation of the motor. In some such cases, the motor management system 140 can determine that the motor is lightly loaded if the current does not satisfy a current threshold at full speed. Such a scenario is depicted at Time B of FIG. 3. As a corollary, the motor management system 140 can determine that the motor is not lightly loaded if the current satisfies the current threshold at full speed. In some cases, making the determination based on a previous operational cycle can be referred to as a prescriptive technique. For example, the load condition can be determined at or near the time of coast stop and a prescriptive or predetermined alpha advance algorithm can be applied upon restart based on the load conditions and/or how long it has been since stop.

In other cases, the determination of the motor's load condition can be based on operating data corresponding to after the point of restart. In some cases, making the determination based on a current operational cycle can be referred to as a 'perturb and observe' technique. For example, the motor management system 140 can analyze one or more of the motor's speed, current, root mean square (RMS) current or voltage, or firing angle to determine if the motor is lightly loaded. For example, if the RMS current does not satisfy a current threshold, the motor management system 140 can determine that the electric motor is operating under a lightly loaded state. As a corollary, if the motor's speed is high while the RMS current and/or RMS voltage satisfies a current or voltage threshold, respectively, the motor management system 140 can determine that the electric motor is not operating under a lightly loaded state.

Consider a scenario where the alpha firing angle is initiated and subsequently advanced. In some such cases, if the phase current does not react as anticipated (e.g., does not satisfy a threshold), the motor management system 140 can determine a light-load condition. As a corrective measure (e.g., at block 416), the alpha angle can be swiftly advanced. This assessment can be made possible by the motor management system 140, which can observe the current profile, tracking the RMS current over time relative to the applied voltage.

At block 404, the motor management system 140 determines that the motor is still spinning, such as from a prior operational cycle. As described herein, some motors, particularly those that are typically operated under light loads, exhibit a tendency to retain a degree of inertia when their operation is halted. This inertia manifests as sustained rotation of the motor's shaft, persisting even in the absence of a connected power supply. As described herein, the operational scenario where a motor is restarted while the shaft is still in motion can be referred to as a 'rapid restart' of the motor.

At block 406, the motor management system 140 verifies the deactivation or non-presence of a "backspin wait" mode. In this context, a "backspin wait" refers to a function or feature in which the motor management system 140 waits for any residual spinning or rotation (backspin) to stop before attempting to restart the motor. This could be a safety feature designed to prevent possible mechanical stress or damage that could arise from restarting a motor that is still in residual motion. However, in the context of the inventive concepts outlined herein, a backspin wait mode may not be active or even implemented. This is because the inventive concepts handle scenarios where the electric motor 160 is restarted while still spinning from a previous cycle, thereby mitigating the issues that a backspin wait mode might address. Therefore, in some implementations, the motor management system 140 can either verify that no wait period is scheduled before restarting the motor, or it can entirely bypass this validation step.

At block 408, the motor management system 140 communicates a first command signal that initiates a first acceleration profile for the electric motor 160. In some cases, application of the first acceleration profile starts, or restarts, the electric motor 160. The first acceleration profile can be characterized by a first firing angle and a first rate of increase in the firing angle. The first firing angle can be the initial angular position of the semiconductor switches 122 when the motor is started. The first rate of increase can be a systematic escalation of the firing angle over time, starting from the first firing angle, in order to modulate the power delivered to the motor.

The first firing angle can vary across embodiments. In certain instances, the initial firing angle is set to a relatively large, retarded angle to mitigate the potential impact of asymmetric magnetic inrush when power is first supplied to the motor. For instance, the first firing angle can be 125, 130, 135, 140, 145, 150, 155, 160, or 160 degrees (+/− a few degrees). As another example, the first firing angle can be greater than about 135 degrees, greater than about 145 degrees, or greater than about 155 degrees. As another example, the first firing angle can be between about 120 about and about 180 degrees, between about 130 about and about 170 degrees, or between about 140 about and about 160 degrees. In some cases, the first firing angle is a predetermined value, for example based on the first acceleration profile. In some cases, the first firing angle is determined based on specific motor requirements or environmental conditions.

The rate of increase of the firing angle can refer to the speed at which the firing angle, which typically ranges from 0 to 180 degrees per half-cycle, is modified. In some cases, a 0-degree firing angle signifies a fully "on" state of a semiconductor switch, while a 180-degree angle represents a fully "off" state. In this context, an "increase" in the firing angle can indicate an advancement in the firing event within the AC cycle, effectively moving towards 0 degrees. This movement augments the conduction period of the switch, thereby permitting a greater portion of the AC waveform to reach the motor, subsequently escalating the power delivered to the motor. Therefore, a first firing angle that is set at a delayed or "retarded" position such as 135 degrees can "increase" to an earlier firing point like 60 degrees. Thus, in some cases, an increase in firing angle can refer to a decrease in the numeric value of the firing angle.

The first rate of increase can represent a systematic increase in the firing angle over a given period, characterizing the motor's progression from the first firing angle. The form of this systematic increase can vary. For example, in some cases, the systematic increase follows a uniform pattern. In some cases, the systematic increase is non-uniform. In certain cases, the systematic increase incorporates a stepwise pattern, where the firing angle advances in discrete jumps or "steps" from the first firing angle towards a target firing angle. The number of steps can vary. In some cases, the systematic increase is linear. In some cases, the systematic increase is exponential. In some cases, the pattern of increases may form a reverse S-shaped or reverse J-shaped exponential curve, representing a rapid initial increase in the firing angle, followed by a slower, more gradual escalation as the target firing angle is approached.

In some cases, the systematic increase occurs for a predetermined duration of time. The length of the predetermined duration of time can vary across embodiments. For example, the length of the first predetermined duration of time can be less than or equal to 1, 2, 3, 4, or 5 seconds (+/− about 500 ms), between about 500 ms and about 2.5 seconds, or greater than 400 ms, 800 ms, 1 second, or 1.5 seconds. It should be appreciated that various other durations may be used. In some cases, the systematic increase can continue until one or more conditions are satisfied, as described at least with respect to block 410.

At block 410, the motor management system 140 identifies the occurrence of a first condition. In some cases, the occurrence of the first condition can serve as an indicator signaling to transition from the first acceleration profile to a second acceleration profile. In some such cases, the first acceleration profile's systematic increase in the firing angle is sustained until the occurrence of the first condition.

In some cases, the first condition arises when the initial ramping of the alpha angle does not produce a current that exceeds a transition threshold (sometimes referred to as up-to-speed detection). This scenario can be seen as the converse of a transition to bypass mode since it happens at the beginning of the ramp. For example, as shown in FIGS. 2, 3, and 5, adequate current can be produced during the ramp start because the motor can start from a resting state, necessitating the acceleration of its inertia. However, during the re-start conditions depicted in FIGS. 3 and 5, the current required to bring the motor's shaft to full speed can be minimal. As a result, it can stay below the transition level, ensuring the sequencing to transition to bypass mode remains unaffected. If it were to exceed the transition threshold and then immediately decline, it can disrupt the sequencing, leading to a false up-to-speed detection as highlighted herein.

The motor management system 140 can obtain sensor signals from one or more sensors to obtain values of one or more operational parameters. The one or more sensors can include, but are not limited to, a rotational measurement device such as tachometers or encoders for measuring the motor's shaft speed, a current-measuring device such as a current transformer or a Hall effect sensor for measuring the phase current flowing through the motor's windings, or a voltage-measuring device such as a voltage divider or voltage transformer for measuring the motor's RMS voltage. In some cases, the one or more sensors can include the phase-locked loop (PLL) system 141 (e.g., to ensure synchronization of the command signals with the frequency of the power supply), the reference generator 120, or the power sensing system 146. The sensor signals gathered by the motor management system 140 can correspond to or be utilized to compute one or more operational parameters of the motor. The one or more operational parameters can include, but are not limited to, the motor's torque, shaft speed, turning force, the voltage drawn by the motor, the total current drawn by the motor, phase current, Root Mean Square (RMS) voltage, or the firing (alpha) angle of the semiconductor switches. These parameters can be derived directly or indirectly from the sensor signals.

In some cases, the first condition is tied to one or more of the motor's operational parameters. For example, a parameter can have a specific threshold value, and the first condition can arise when one or more of these parameters meet their respective thresholds. Alternatively or additionally, the first condition may correspond to the elapse of a predetermined delay period since the start of the first acceleration profile.

In certain embodiments, when the motor management system 140 is not engaged in identifying the first condition, a "do not detect up-to-speed" protocol is implemented. As the Alpha angle transitions from an initial value (e.g., 135 degrees) to a subsequent value (e.g., 112.5 degrees), the motor management system 140 can be configured to withhold up-to-speed detections. This configuration can advantageously mitigate potential inaccuracies identifying the motor as operating at full speed prematurely. Consider a scenario where the first condition is met if the phase current RMS hasn't surpassed 120% of the transition level, typically 185% of the motor's rated FLA (effectively 222%), and the alpha angle exceeds 120 degrees, having typically started between 135 to 150 degrees. It will be appreciated that other percentages may be used. For example, the first condition can be met when the phase current RMS has/or has not satisfied 90%, 100%, 110%, 120%, 130%, 140%, 150%, 160%, 170%, 180%, 190%, 200%, 210%, 220%, 230%, 240%, 250%, or 260% (+/− a few %) of a rated FLA of the electric motor.

At block 412, the motor management system 140 communicates a second command signal that initiates a second acceleration profile for the motor, for example based on the occurrence of the first condition. The second acceleration profile can be characterized by a more aggressive rate of increase in the firing angle, designated here as the second rate of increase. This faster rate means that the firing angle shifts earlier in the AC cycle at a quicker pace, allowing the motor to receive more of the AC waveform and thus a greater amount of power in a shorter period of time.

In some cases, similar to the first acceleration profile, the second acceleration profile systematically escalates the firing angle over a designated time period. This time period can vary based on specific operational conditions or motor requirements. The second rate of increase may follow a pattern similar to that described of the first rate—it can be uniform or non-uniform, stepwise, linear, or exponential, following a reverse S-shaped or reverse J-shaped curve. The pattern and rate of increase can be predetermined or dynamically adjusted based on real-time motor parameters or feedback.

In the context of an acceleration profile, the term "systematic" can underscore a gradual, controlled change in the firing angle over a specified duration, rather than an instantaneous leap to the target firing angle. This strategic alteration over time can allow the motor management system 140 to modulate power delivery to the electric motor 160 in a fine-tuned manner. By gradually shifting the firing angle earlier in the AC cycle, the motor management system 140 systematically increases the conduction period of the semiconductor switches, allowing more of the AC waveform to reach the motor and gradually escalating the power delivered to the motor. The rate at which this systematic increase happens can vary, with the second acceleration profile employing a faster rate than the first, hence accelerating the motor towards its desired operational speed more swiftly.

In certain embodiments, the second rate of increase can represent a multiple of the first rate of increase. To illustrate, the second rate might be X times the first rate, with X having example values such as 1.25, 1.5, 2, 4, 6, 8, 12, or 15. As another example, X can range between 1.5 to 15, between 2 to 10, or between 3 to 6.

Alternatively, the second acceleration profile can differ from the systematic approach of the first acceleration profile. Instead, the second acceleration profile can be characterized by a rapid transition to a target firing angle, which is the full advance of the firing angle. At this stage, full voltage is applied, with all six thyristors firing at a full alpha angle of 0 degrees. This ensures the motor receives a substantial portion of the AC waveform, leading to a significant power surge in a notably brief duration.

At block 414, the motor management system 140 identifies the occurrence of a second condition. In some cases, the occurrence of the second condition can serve as an indicator signaling to transition from the second acceleration profile to a third acceleration profile. In some such cases, the second acceleration profile's systematic increase in the firing angle is sustained until the occurrence of the second condition.

As an illustrative, non-limiting example, the second condition may be defined by the firing angle meeting a designated second firing angle threshold and the phase current reaching a specified second current threshold. The exact values for the second firing angle threshold and the second current threshold can differ among various embodiments. For instance, potential values for the second firing angle threshold might include alpha angles of 75, 80, 85, 90, 95, or 100 degrees. Similarly, the second phase current threshold might be set at 30%, 35%, 40%, or 45% of the motor's rated FLA.

At block 416, the motor management system 140 communicates a third command signal, initiating a third acceleration profile for the motor. The third acceleration profile can differ from the systematic approach of the first acceleration profile and/or the second acceleration profile. Instead, the third acceleration profile is characterized by a rapid transition to a target firing angle, which is the full advance of the firing angle. At this stage, full voltage is applied, with all six thyristors firing at a full alpha angle of 0 degrees. This ensures the motor receives a substantial portion of the AC waveform, leading to a significant power surge in a notably brief duration.

In certain embodiments, the third acceleration profile can be distinct from the second acceleration profile. For instance, upon satisfaction of the second condition and progression of the alpha from the second rate to 50 degrees, full voltage can be applied utilizing all six thyristors at a complete alpha angle. At this juncture, a full alpha fire angle, specifically 0 degrees within the scope of this disclosure, can be employed, facilitating the delivery of full voltage to the motor via the electronics even prior to the initiation of a signal to engage the bypass switch. The operational significance of this event can be attributed to its mechanism: in the context of employing a soft-starter for motor ramp-up, typically only one positive-oriented device and one negative-oriented device are alpha fired concurrently. Yet, when the alpha surpasses 60 degrees, there can be simultaneous firing of three devices, inducing an overlap in commands. This configuration can lead to six discrete firing events within a single line-cycle. Conversely, under the parameters of the second condition, all six thyristors can be intentionally fired at full alpha, aiming to concurrently apply full voltage across all three phases. In some cases, the basis for the second condition can be predicated on a combination of the alpha angle and the motor's diminished current the alpha angle.

The implementation of the routine 400, and in particular the third acceleration profile, can be particularly advantageous for operational scenarios requiring frequent start-stop cycles. By enabling the motor to restart with minimal delay between stoppages, the overall operational efficiency can be notably enhanced.

In the context of routine 400 for starting a lightly loaded motor that is still spinning, there can be flexibility in the number and arrangement of control blocks, and certain blocks can be omitted, executed concurrently, or in different orders. The routine 400 involves dynamically switching between multiple distinct acceleration profiles, tailoring the control strategy to the motor's operational conditions. The first acceleration profile, initiated at block 408, gradually increases the firing angle over a predetermined duration to modulate power delivery to the motor. When operational parameters suggest the motor is still spinning and/or lightly loaded, as identified at block 410, the second acceleration profile is deployed. This second profile, activated to advance the motor more swiftly to operational speed, employs a faster rate of increase in the firing angle. As the routine 400 progresses to block 414 and satisfies the second condition, the third acceleration profile is communicated. This third profile bypasses gradual increments and rapidly advances the firing angle to full advance, providing the motor with a substantial power boost in a short span of time. By selecting different combinations of these profiles, one or more profiles may be omitted, resulting in fewer acceleration profiles for routine 400. For example, blocks 410 and 412 may be omitted, resulting in only two acceleration profiles: the first gradual profile and the third rapid profile. The inventive concepts effectively address challenges associated with rapidly restarting lightly loaded motors, reducing disruptive phase current fluctuations and vibrations, and enhancing operational efficiency and reliability, particularly in industrial applications with frequent start-stop cycles.

FIG. 5 presents graph 500, a detailed illustration showcasing the application of routine 400 during different operational stages of the electric motor 160 under light load conditions. The graph plots time on the x-axis and motor parameters on the y-axis, including shaft speed, phase current, RMS voltage, and angle alpha.

Similar to the motor behavior depicted in graph 200 of FIG. 2, graph 500 (FIG. 5) showcases the motor's progression from Time A to Time B. During this period, the motor initiates from rest with a ramp start and accelerates until it reaches its synchronous speed. At Time B, a stop command is issued, prompting the motor to stop, gradually. As shown, the motor slows down but retains some residual spinning momentum.

At Time C, the motor management system initiates the first acceleration profile, gradually increasing the firing angle to control power delivery. As the timeline progresses to Time D, the second acceleration profile is engaged, demonstrating a faster rate of increase in the firing angle compared to the first acceleration profile (Time C to Time D). The graph 500 illustrates a distinct vertical rise in the firing angle at Time E, signifying the activation of the third acceleration profile. This rapid transition bypasses gradual increments, providing the electric motor 160 with a substantial power boost in a shorter duration. In comparison to FIG. 3, the total alpha advance period is shorter, showcasing a reduction in the duration of the period of phase current oscillations and vibrations.

Terminology

Although this disclosure has been described in the context of certain cases and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some cases, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain cases include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain cases require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain cases, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for mitigating phase current oscillations and vibrations in a spinning, lightly loaded three-phase electric motor, wherein the electric motor is configured to receive power from three distinct electrical phases, comprising:
communicating a first command signal to transition to a first acceleration profile, wherein the first acceleration profile is characterized by a first firing angle value and a first rate, wherein transitioning to the first acceleration profile configures a firing angle of a set of thyristors to the first firing angle value and a firing angle rate of change to the first rate, wherein the firing angle corresponds to an angular position of the set of thyristors, wherein each phase of a three-phase power supply to the electric motor is controlled by a pair of thyristors from the set of thyristors, and wherein power supplied to the electric motor is modulated based on the firing angle;
determining an occurrence of a first condition, wherein the occurrence of the first condition indicates that the electric motor had residual motion and was lightly loaded upon transition to the first acceleration profile, wherein the first condition is characterized by an elapse of a predetermined delay period since the transition to the first acceleration profile and an RMS current of the electric motor failing to satisfy a first current threshold;
communicating a second command signal to transition to a second acceleration profile based on the occurrence of the first condition, wherein the second acceleration profile is characterized by a second rate, wherein transitioning to the second acceleration profile configures the firing angle rate of change to the second rate, and wherein the second rate is greater than the first rate;
determining an occurrence of a second condition, wherein the second condition is characterized by the firing angle satisfying a firing angle threshold and the RMS current failing to satisfy a second current threshold; and
communicating a third command signal to transition to a third acceleration profile, wherein the third acceleration profile is characterized by a second firing angle value, wherein transitioning to the third acceleration profile configures the firing angle to the second firing angle value, wherein the second firing angle value corresponds to full operation of the electric motor, wherein transitioning to the third acceleration profile results in application of full voltage on all three distinct electrical phase simultaneously.

2. A method for controlling an electric motor, comprising:
communicating a first command signal to transition to a first acceleration profile, wherein the first acceleration profile is characterized by a first firing angle value and a first rate, wherein transitioning to the first acceleration profile configures a firing angle of a set of semiconductor switches to the first firing angle value and a firing angle rate of change to the first rate, wherein the firing angle corresponds to an angular position of the set of semiconductor switches, and wherein power supplied to the electric motor is modulated based on the firing angle;
determining an occurrence of a first condition;
communicating a second command signal to transition to a second acceleration profile based on the occurrence of the first condition, wherein the second acceleration profile is characterized by a second rate, wherein transitioning to the second acceleration profile configures the firing angle rate of change to the second rate, and wherein the second rate is greater than the first rate;

determining an occurrence of a second condition; and communicating a third command signal to transition to a third acceleration profile, wherein the third acceleration profile is characterized by a second firing angle value, wherein transitioning to the third acceleration profile configures the firing angle to the second firing angle value, wherein the second firing angle value corresponds to full operation of the electric motor.

3. The method of claim 2, wherein the first condition is characterized by an RMS current of the electric motor failing to satisfy a first current threshold.

4. The method of claim 3, wherein the first current threshold is at least 150% of a rated FLA of the electric motor.

5. The method of claim 3, wherein the first condition is further characterized by an elapse of a predetermined delay period since the transition to the first acceleration profile.

6. The method of claim 3, wherein the first condition is further characterized by the firing angle satisfying a first firing angle threshold.

7. The method of claim 2, wherein the occurrence of the first condition indicates that the electric motor had residual motion and was lightly loaded upon transition to the first acceleration profile.

8. The method of claim 2, wherein the second rate is greater than 1.5 times the first rate.

9. The method of claim 2, wherein the second rate is greater than 4 times the first rate.

10. The method of claim 2, wherein the occurrence of the second condition is characterized by the firing angle satisfying a firing angle threshold and an RMS current failing to satisfy a second current threshold.

11. The method of claim 10, wherein the firing angle threshold is about 85 degrees, and wherein the second current threshold is about 40% of a rated FLA of the electric motor.

12. The method of claim 2, wherein the set of semiconductor switches comprises six thyristors, wherein each phase of a three-phase power supply to the electric motor is controlled by a pair of thyristors from the set of thyristors, wherein transitioning to the third acceleration profile results in firing of all six thyristors with full voltage on all three distinct electrical phase simultaneously.

13. The method of claim 2, wherein configuring the firing angle to the first firing angle value provides current to the electric motor without inducing asymmetric magnetic inrush.

14. The method of claim 2, further comprising ignoring up-to-speed detections while the firing angle advances from 135 through 112.5 degrees.

15. The method of claim 2, wherein transitioning to the third acceleration profile results in an abrupt transition of the firing angle of the semiconductor switches to a fully advanced position.

16. A motor starter for mitigating phase current oscillations and vibrations in a spinning, lightly loaded electric motor, comprising:

a set of semiconductor switches configured to couple respective phases of an AC power source to respective phases of a motor; and a control circuit configured to:

communicate a first command signal to transition to a first acceleration profile, wherein the first acceleration profile is characterized by a first firing angle value and a first rate, wherein transitioning to the first acceleration profile configures a firing angle of the set of semiconductor switches to the first firing angle value and a firing angle rate of change to the first rate, wherein the firing angle corresponds to an angular position of the set of semiconductor switches, and wherein power supplied to the electric motor is modulated based on the firing angle;

communicate a second command signal to transition to a second acceleration profile based on an occurrence of a first condition, wherein the second acceleration profile is characterized by a second rate, wherein transitioning to the second acceleration profile configures the firing angle rate of change to the second rate, and wherein the second rate is greater than the first rate; and communicate a third command signal to transition to a third acceleration profile based on an occurrence of a second condition, wherein the third acceleration profile is characterized by a second firing angle value, wherein transitioning to the third acceleration profile configures the firing angle to the second firing angle value, wherein the second firing angle value corresponds to full operation of the electric motor.

17. The motor starter of claim 16, wherein the first condition is characterized by an RMS current of the electric motor failing to satisfy a first current threshold, an elapse of a predetermined delay period since the transition to the first acceleration profile, and the firing angle satisfying a first firing angle threshold.

18. The motor starter of claim 17, wherein the first current threshold is at least 150% of a rated FLA of the electric motor.

19. The motor starter of claim 17, wherein the occurrence of the first condition indicates that the electric motor had residual motion and was lightly loaded upon transition to the first acceleration profile.

20. The motor starter of claim 17, wherein the occurrence of the second condition is characterized by the firing angle satisfying a firing angle threshold and the RMS current failing to satisfy a second current threshold, wherein the second current threshold is between about 35% to 45% of a rated FLA of the electric motor.

* * * * *